Oct. 9, 1962     D. J. HAHN     3,057,580
AIRCRAFT CONTROL SURFACE PROTECTOR
Filed April 4, 1960
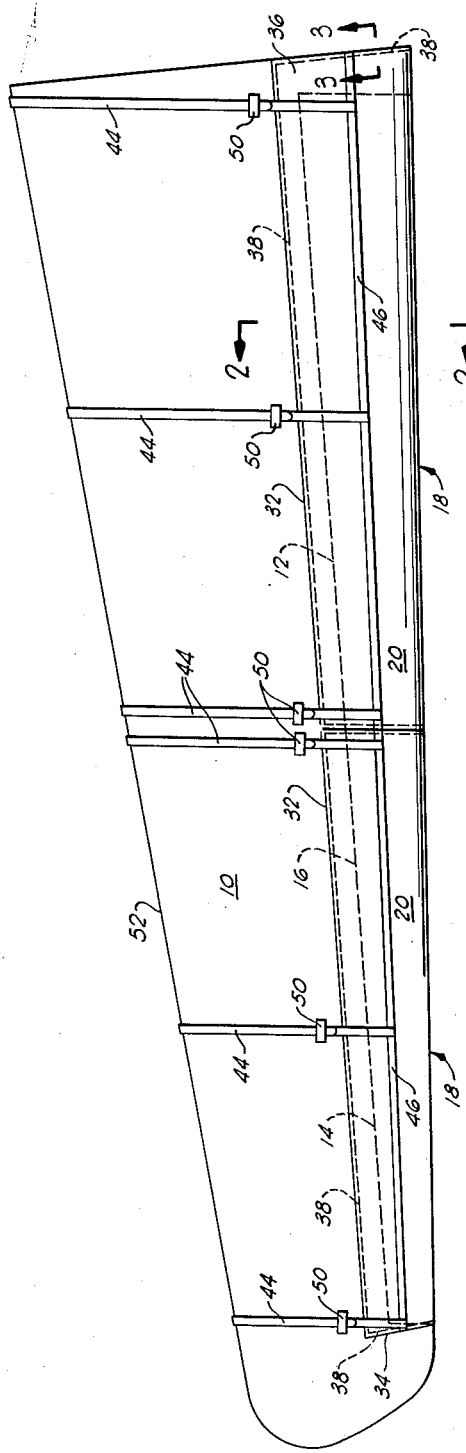
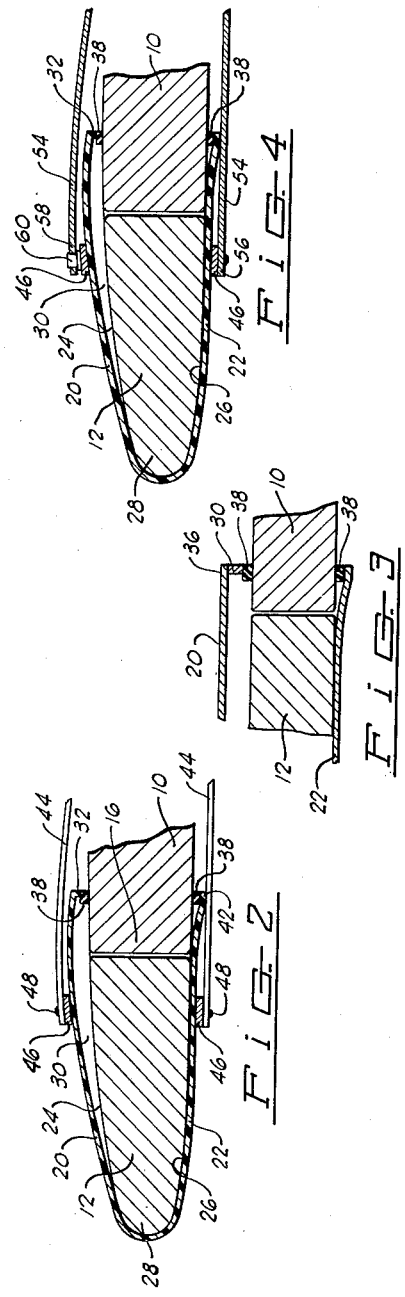
INVENTOR.
DANIEL J. HAHN
BY
ATTORNEY United States Patent Office 3,057,580
Patented Oct. 9, 1962

3,057,580
AIRCRAFT CONTROL SURFACE PROTECTOR
Daniel J. Hahn, 3620 Meadow Brook Drive,
Midwest City, Okla.
Filed Apr. 4, 1960, Ser. No. 19,694
6 Claims. (Cl. 244—1)

This invention relates generally to improvements in aircraft, and more particularly, but not by way of limitation, to an improved protector for a control surface of an aircraft to prevent damage to the control surface when the aircraft is stored outdoors.

As it is well known in the art, the control surfaces, such as the ailerons, of substantially all types of aircraft are particularly susceptible to damage by hail, freezing rain, etc., when the aircraft are parked out of doors in inclement weather. As it is also well known in the art, hangar space is not always available or conveniently accessible. Up to the present time, no satisfactory protective coverings have been available for protecting the control surfaces of a parked aircraft. Therefore, a substantial amount of damage is frequently incurred when aircraft are merely tied down.

The present invention contemplates a novel aircraft control surface protector which may be easily and conveniently installed on a parked aircraft in a minimum of time and with a minimum of effort. The protector generally comprises a U-shaped body which is contoured to fit over an aircraft control member, such as an aileron, and seal itself in position over the aileron to prevent the entrance of moisture between the protector and the control surface. The body is secured over the control member in any desired manner and is formed of a material which will readily withstand hail or the like to adequately protect the control member. In a preferred embodiment, the U-shaped body is a molded Fiberglas member to provide a lightweight construction easily handled by a single operator and providing the desired protection against hail, etc.

An important object of this invention is to minimize damage to aircraft parked in exposed positions in foul weather.

Another object of this invention is to negative the necessity of moving aircraft into hangars and the like when the aircraft are not in use.

A further object of this invention is to provide a protective covering for the control surfaces of an aircraft which will remain in place during high winds and other inclement weather conditions.

Another object of this invention is to provide a protective covering for each control member of an aircraft which is lightweight and which may be easily installed on the respective control member by a single operator in a minimum of time.

A still further object of this invention is to provide a protective covering for the control surfaces of aircraft which is simple in construction, may be economically manufactured and which will have a long service life.

Other objects and advantages of the invention will be evident from the following detailed description, when read in conjunction with the accompanying drawings which illustrate my invention.

In the drawings:

FIGURE 1 is a plan view of the left wing of a typical aircraft having a pair of protective coverings constructed in accordance with this invention installed over the ailerons of the wing.

FIGURE 2 is a sectional view as taken along lines 2—2 of FIG. 1.

FIGURE 3 is a sectional view as taken along lines 3—3 of FIG. 1.

FIGURE 4 is a view similar to FIG. 2 illustrating a modified construction.

Referring to the drawings in detail, and particularly FIGS. 1 and 2, reference character 10 designates a typical airfoil in the form of a wing of an aircraft which has a pair of control members 12 and 14 on the trailing edge 16 thereof. The control members 12 and 14 are in the form of inboard and outboard ailerons, respectively.

In accordance with the present invention, a protective covering 18 in the form of a U-shaped body is secured over each of the control members 12 and 14 of the airfoil 10. As shown mostly clearly in FIGS. 2 and 3, each covering 18 includes an upper panel 20 and a lower panel 22 spaced apart sufficient distances to extend over the upper surface 24 and the lower surface 26 of the respective control member 12 or 14. The lower panel 22 of each covering 18 is curved to mate with the lower surface 26 of the respective control member and extends from the trailing end 28 of the control member over the trailing edge portion 16 of the airfoil 10.

The upper panel 20 extends above the upper surface 24 of the respective control member and has an insert 30 secured under each end thereof curved to fit the contour of the adjacent upper surfaces of the control member and/or airfoil. It will be observed in FIG. 2 that the upper panel 20 also extends over the trailing edge portion 16 of the airfoil 10. Also, the forward edge 32 of the upper panel 20 is curved downwardly to fit the adjacent portion of the airfoil 10. It will therefore be apparent that the upper panel 20 is dished or concaved and is supported by the inserts 30 to extend the main body portion thereof above the respective control member 12 or 14 and to overlap the trailing edge portion of the airfoil 10.

In a preferred embodiment of this invention, each covering 18 is formed of a semi-rigid material which is flexible to a small degree but will tend to retain its shape, and, in any event, must be formed of a material which will withstand and not be damaged by hail or the like. I have found that the body 18 may be easily formed of a material such as Fiberglas, which is easily molded into the desired configuration and is lightweight for easy handling. The inserts 30 may also be formed of Fiberglas and easily cemented or otherwise secured to the respective upper panels 20. It will also be apparent, however, that the inserts 30 may be formed integrally with the remainder of the respective upper panels 20, if desired.

As shown in FIG. 1, each covering 18 has a length slightly greater than the length of the respective control member 12 or 14 to position the edges of the covering over stationary portions of the airfoil 10, where possible. In the installation shown in FIG. 1, the coverings 18 are placed in abutting relation at the junction of the two control members 12 and 14, such that the outer end 34 of the outboard covering 18 projects beyond the respective end of the outboard control member 14, and the inner end 36 of the inboard covering 18 projects inwardly of the respective end of the inboard control member 12. Although it was previously noted that the lower panel 22 of each covering was curved to mate with the contour of the respective control member, it will be understood that those sections of the airfoil 10 in horizontal alignment with the control members have the same contour as the adjacent control members. In other words, when the control members 12 and 14 are placed in inoperative positions, as illustrated in FIG. 2, the control members 12 and 14 are in alignment with adjacent portions of the airfoil 10, such that the complete airfoil 10 will have a relatively smooth outline when viewed in cross section. Therefore, the outer end 34 of the outboard covering 18 and the inner end 36 of the inboard covering 18 are curved in conformity with the respective portions of the airfoil 10 over which they extend.

In order to prevent the entrance of moisture between each covering 18 and the adjacent surfaces of the respective control member, I prefer to provide sealing strips 38 (FIGS. 2 and 3) around the forward and end edges of each of the upper and lower panels 20 and 22. Each sealing strip 38 may be easily secured to the respective edge of the covering 18 or to the respective insert 30 by means of glue or cement in a position to be pressed against the respective surface of the airfoil and/or control member. In this connection it should also be noted that I prefer to form each covering 18 in such a manner that the distance between the forward edge 32 of the upper panel 20 and the forward edge 42 of the lower panel 22 is slightly less than the thickness of the airfoil 10 at the installed location of the respective edges 32 and 42. Therefore, when the covering 18 is formed of a flexible, but semi-rigid material, the upper and lower panels 20 and 22 are sprung apart as the respective covering is inserted over the respective control member and the trailing edge portion 16 of the airfoil 10, such that the sealing strips 38 will be pressed tightly against the adjacent surfaces of the airfoil 10 and control member when the panels 20 and 22 are released. The sealing strips 38 will therefore be retained in tight contact with the adjacent surfaces of the airfoil 10 and control member to prevent the entrance of moisture into the covering 18.

Although the sealing strips 38 are retained pressed against the respective surfaces of the airfoil 10 and control members 12 and 14, such that the coverings 18 will remain in their desired positions during normal weather conditions, I also prefer to provide fasteners, such as belts 44, extending around the airfoil 10 to assure that the coverings 18 will not be blown off of the airfoil. Any desired number of belts 44 may be provided for each covering 18, depending upon the size of the covering. The opposite ends of each belt are attached to the respective upper panel 20 and lower panel 22 in any suitable manner, such as by the use of metal strips 46 anchored to the respective panel by screws 48 and with selected screws 48 extending through the respective end of the belt 44. Each belt 44 may be easily formed of a web type of material and provided with a suitable buckle 50 to facilitate the fastening of the belts around the leading edge 52 of the airfoil 10.

In a modified embodiment of this invention, each covering 18 is retained in the desired position by means of a fabric sheet 54 (see FIG. 4) in lieu of the belts 44. The sheet of fabric 54 has one edge 56 thereof suitably fastened to a metal strip 46 extending along the lower panel 22, and the opposite edge 58 of the sheet 54 is fastened to the opposite metal strip 46 by suitable snap type fasteners 60. The sheet 54 is preferably formed of a flexible moisture-proof material, such as treated canvas, and is of a size to completely cover that portion of the airfoil 10 extending forwardly of the respective covering 18. Therefore, the sheet 54 protects the airfoil 10 from freezing rain and adds to the protection provided by the respective covering 18.

In a commercial use of the present invention, one of the coverings 18 is provided for each control member of an aircraft and is contoured or shaped to conform to the respective control member and airfoil. For example, one of the coverings 18 will be provided for each control member on each wing and each tail section of an aircraft. Each covering 18 is individually installed over the respective control member when the aircraft is parked in an exposed position in foul weather, such that the sealing strips 38 prevent the entrance of moisture between the covering and the respective control surfaces, and the upper and lower panels 20 and 22 protect these control surfaces from hail or the like. In this connection, it should be noted that the upper panel 20 is dished upwardly from the respective control surface to further assure that the control surface will not be damaged in the event the panel is slightly bent by unusually large hail or the like. As previously indicated, each covering 18 is preferably formed of a lightweight material, such as Fiberglas, which can be easily molded to the desired configuration and easily handled by a single operator. It may be further noted that the coverings 18 can be easily removed when the aircraft is to be placed in operation.

From the foregoing it will be apparent that the present invention will provide the maximum protection for aircraft parked in exposed positions during inclement weather conditions to negative the necessity for storing the aircraft in hangars and the like. The control surfaces of an aircraft will be fully protected against hail, freezing rain and the like to assure that the aircraft will be in condition for flight when necessary. It will also be apparent that the present protective covering is simple in construction, may be economically manufactured and will have a long service life.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:
1. In combination with an aircraft airfoil having a leading edge and a trailing edge and having a control member attached to the trailing edge thereof; a foul weather control surface protector, comprising a substantially U-shaped semi-rigid body enclosing the control member, said body having an upper panel portion extending forwardly over the upper surface of the control member and the trailing edge of the airfoil and having a lower panel portion extending under the lower surface of the control member and the trailing edge of the airfoil, said body being formed of a hail resistant and moisture impervious material and having a length at least equal to the length of the control member, means for detachably securing said body over the control member, and means for sealing the edges of said body to the adjacent surfaces of the airfoil and control member for preventing the entrance of moisture between said body and the surfaces of the control member.

2. The combination defined in claim 1 wherein said body is formed of Fiberglas, said upper panel portion is extended above the control member, and characterized further to include an insert secured under each end of said upper panel curved to the contour of the respective surfaces of the airfoil and control member.

3. The combination defined in claim 2 wherein the distance between the forward edges of said upper panel and lower panel portions is normally less than the thickness of the portion of the airfoil disposed therebetween.

4. The combination defined in claim 1 wherein said sealing means comprises an elastic material strip secured to each edge of said body in contact with the adjacent surfaces of the airfoil and control member.

5. The combination defined in claim 1 wherein said securing means comprises a plurality of belts secured at their opposite ends to said body and extending over the leading edge of the airfoil.

6. The combination defined in claim 1 wherein said securing means comprises a flexible moisture-proof sheet secured at its opposite ends to said body and extending over the leading edge of the airfoil.

References Cited in the file of this patent

UNITED STATES PATENTS

| | | |
|---|---|---|
| 1,888,289 | Raffles | Nov. 22, 1932 |
| 2,013,323 | Waner | Sept. 3, 1935 |
| 2,720,236 | Hoffman | Oct. 11, 1955 |